(12) United States Patent　　(10) Patent No.: US 10,067,526 B2
Fukatsu et al.　　(45) Date of Patent: Sep. 4, 2018

(54) OPERATION PEDAL DEVICE FOR VEHICLE

(71) Applicant: TOYODA IRON WORKS CO., LTD., Toyota-shi, Aichi (JP)

(72) Inventors: Yoshinobu Fukatsu, Toyota (JP); Masayuki Nagata, Toyota (JP); Shun Takamura, Nisshin (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 54 days.

(21) Appl. No.: 15/031,336

(22) PCT Filed: Jul. 15, 2014

(86) PCT No.: PCT/JP2014/068831
§ 371 (c)(1),
(2) Date: Apr. 22, 2016

(87) PCT Pub. No.: WO2015/064156
PCT Pub. Date: May 7, 2015

(65) Prior Publication Data
US 2016/0259361 A1　　Sep. 8, 2016

(30) Foreign Application Priority Data

Nov. 1, 2013　(JP) ................................ 2013-227905

(51) Int. Cl.
*G05G 1/30*　　(2008.04)
*B60K 26/02*　　(2006.01)
(Continued)

(52) U.S. Cl.
CPC ............... *G05G 1/38* (2013.01); *B60K 26/02* (2013.01); *B60K 26/04* (2013.01); *B60T 7/042* (2013.01); *G05G 1/30* (2013.01); *G05G 1/44* (2013.01)

(58) Field of Classification Search
CPC ... G05G 1/30; G05G 1/38; G05G 1/44; B60K 26/02; B60K 26/04; B60T 7/04; B60T 7/042; B60T 7/065
See application file for complete search history.

(56) References Cited

U.S. PATENT DOCUMENTS

| | | | |
|---|---|---|---|
| 6,220,222 B1 * | 4/2001 | Kalsi | B60K 26/02 |
| | | | 123/399 |
| 7,051,616 B2 * | 5/2006 | Yokochi | G05G 1/38 |
| | | | 74/513 |

(Continued)

FOREIGN PATENT DOCUMENTS

| | | |
|---|---|---|
| CN | 101802744 A | 8/2010 |
| CN | 102398517 A | 4/2012 |

(Continued)

OTHER PUBLICATIONS

Jun. 14, 2017 Office Action issued in Chinese Patent Application No. 201480057983.0.

(Continued)

*Primary Examiner* — Adam D Rogers
(74) *Attorney, Agent, or Firm* — Oliff PLC (57) ABSTRACT

A vehicle operation pedal device including a pedal bracket attached to a vehicle, a pedal arm swingably supported by the pedal bracket about a substantially horizontal support axis, extending downward from the pedal bracket, and having at its lower end a pedal that is operated by being depressed with a foot, and an operation amount sensor disposed on the pedal bracket to detect a pedal arm operation amount, the vehicle operation pedal device having: a cover member including at least a lower wall portion extending from below the operation amount sensor toward a driver's seat and fixedly attached to the pedal bracket; and a reinforcing member made of a metal and fixedly attached to the pedal arm so as to be interposed between the lower wall (Continued)

portion and the operation amount sensor when in an initial state where the pedal arm is not operated by being depressed with the foot.

3 Claims, 8 Drawing Sheets

(51) Int. Cl.
*B60T 7/04* (2006.01)
*G05G 1/38* (2008.04)
*B60K 26/04* (2006.01)
*G05G 1/44* (2008.04)

(56) References Cited

U.S. PATENT DOCUMENTS

| | | | | |
|---|---|---|---|---|
| 9,465,403 B2* | 10/2016 | Kihara | ............... | G05G 1/38 |
| 9,632,525 B2* | 4/2017 | Kaijala | ............... | G05G 1/38 |
| 9,739,639 B2* | 8/2017 | Yamashita | ............ | G01D 5/145 |
| 2006/0117902 A1* | 6/2006 | Martin | ............... | G05G 1/38 |
| | | | | 74/512 |
| 2009/0038431 A1 | 2/2009 | Willemsen et al. | | |
| 2012/0060638 A1 | 3/2012 | Saito et al. | | |
| 2014/0238181 A1* | 8/2014 | Kashiyama | ............ | F02D 11/02 |
| | | | | 74/513 |

FOREIGN PATENT DOCUMENTS

| | | | |
|---|---|---|---|
| DE | 20 2006 010 840 U1 | 9/2006 | |
| JP | 2006290082 A * | 10/2006 | |
| JP | 2011164897 A * | 8/2011 | |
| JP | 2012240565 A * | 12/2012 | ............ B60K 26/02 |
| JP | 2013-006484 A | 1/2013 | |
| JP | 2013006575 A * | 1/2013 | .......... B60K 26/021 |
| JP | 2013-032115 A | 2/2013 | |

OTHER PUBLICATIONS

May 4, 2017 Extended Search Report issued in European Patent Application No. 14858166.3.
Oct. 8, 2016 Office Action issued in Chinese Patent Application No. 201480057983.0.
Dec. 7, 2017 Office Action issued in Chinese Patent Application No. 201480057983.0.
May 28, 2018 Office Action issued in Chinese Patent Application No. 201480057983.0.

* cited by examiner

OPERATION PEDAL DEVICE FOR VEHICLE

TECHNICAL FIELD

The present invention relates to vehicle operation pedal devices, and particularly to an improvement in vehicle operation pedal device having an operation amount sensor disposed on a pedal bracket.

BACKGROUND ART

A vehicle operation pedal device is known in the art which includes (a) a pedal bracket that is attached to a vehicle, (b) a pedal arm that is swingably supported by the pedal bracket about a substantially horizontal support axis, that extends downward from the pedal bracket, and that has at its lower end a pedal that is operated by being depressed with a foot, and (c) an operation amount sensor that is disposed on the pedal bracket to detect the amount by which the pedal arm is operated (see Patent Document 1).

RELATED ART DOCUMENTS

Patent Documents

Patent Document 1: Japanese Patent Application Publication No. 2013-32115
Patent Document 2: Japanese Patent Application Publication No. 2013-6484

SUMMARY OF THE INVENTION

Problem to be Solved by the Invention

Since the operation amount sensor is typically placed in the range that can be reached by a driver's foot, the operation amount sensor may be deformed or damaged if kicked with the driver's foot. As a possible solution to this, for example, a technique described in Patent Document 2, namely a technique of providing a shield portion that restrains contact between a driver's foot and a return spring, can be applied to provide on the pedal arm or the pedal bracket a cover member that protects the operation amount sensor, although this solution is still not known in the art. However, if a metal cover member is used in order to ensure sufficient strength, the weight is significantly increased. It is difficult to mold the cover member with a metal according to the shape of the operation amount sensor, and the cover member therefore becomes unnecessarily large as compared to the operation amount sensor, which significantly increases the weight.

The present invention was developed in view of the above circumstances and it is an object of the present invention to restrain an increase in weight and appropriately prevent damage to an operation amount sensor which is caused by kicking, in a vehicle operation pedal device having an operation amount sensor.

Means for Solving the Problem

To achieve the above object, a first aspect of the invention provides a vehicle operation pedal device including (a) a pedal bracket that is attached to a vehicle, (b) a pedal arm that is swingably supported by the pedal bracket about a substantially horizontal support axis, that extends downward from the pedal bracket, and that has at its lower end a pedal that is operated by being depressed with a foot, and (c) an operation amount sensor that is disposed on the pedal bracket to detect an amount by which the pedal arm is operated, characterized by comprising: (d) a cover member that includes at least a lower wall portion extending from below the operation amount sensor toward a driver's seat and that is fixedly attached to the pedal bracket; and (e) a reinforcing member that is made of a metal and that is fixedly attached to the pedal arm so as to be interposed between the lower wall portion and the operation amount sensor when in an initial state where the pedal arm is not operated by being depressed with the foot.

A second aspect of the invention provides the vehicle operation pedal device recited in the first aspect of the invention, characterized in that the cover member is a single-piece member made of a synthetic resin and including a side wall portion that is continuous with the lower wall portion and disposed outside the operation amount sensor so as to extend upward, and an upper wall portion that is continuous with the side wall portion and disposed above the operation amount sensor, and the cover member covers lower, lateral, and upper sides of the operation amount sensor.

A third aspect of the invention provides the vehicle operation pedal device recited in the second aspect of the invention, characterized in that (a) the cover member further includes a rear wall portion disposed on a rear side of the operation amount sensor, which is an opposite side from the driver's seat, so as not to hinder movement of the reinforcing member which is associated with swinging of the pedal arm, and (b) a reinforcing rib is provided on an inner surface of a corner portion connecting the lower wall portion and the side wall portion.

Advantageous Effects of Invention

In the vehicle operation pedal device as described above, the cover member to protect at least the lower side of the operation amount sensor is attached to the pedal bracket, and the reinforcing member fixed to the pedal arm is interposed between the lower wall portion of the cover member and the operation amount sensor. The cover member thus appropriately prevents damage to the operation amount sensor which is caused by kicking with the foot. Since the reinforcing member prevents excessive deformation of the cover member, for example, a synthetic resin can be used to form a lightweight, inexpensive cover member. Moreover, the reinforcing member need only to be provided in a minimum required range in view of the direction in which the cover member is kicked etc. so that the reinforcing member can prevent breakage and deformation of the cover member. Accordingly, a lightweight, inexpensive vehicle operation pedal device can be produced which ensures predetermined strength.

In the second aspect of the invention, the cover member is a single-piece member made of a synthetic resin and including the side wall portion, and the upper wall portion in addition to the lower wall portion. The cover member thus covers the lower, lateral, and upper sides of the operation amount sensor. The operation amount sensor is therefore appropriately protected not only from kicking with the foot but also from contact with the foot by movements other than kicking and from dust, water, etc. Moreover, since the cover member is made of a synthetic resin, the cover member can be molded with high design flexibility. Namely, the cover member can be easily molded according to various shapes of the pedal bracket, various locations or shapes of the operation amount sensor, etc. so that the operation amount sensor can be appropriately protected.

In the third aspect of the invention, since the rear wall portion is provided so as not to hinder movement of the reinforcing member which is associated with swinging of the pedal arm, the operation amount sensor is more appropriately protected. Since the reinforcing rib is provided in the corner portion connecting the lower wall portion and the side wall portion, rigidity of the cover member is increased. Accordingly, required strength of the pedal device can be achieved, and further reduction in weight can be achieved by reduction in thickness and reduction in size of the reinforcing member.

MODES FOR CARRYING OUT THE INVENTION

The present invention is preferably applied to operation pedal devices for service brakes, but is also applicable to other operation pedal devices for accelerator pedals, parking brakes, etc. The present invention may be applied not only to the case where an output member such as an operating rod is directly coupled to the pedal arm but also to the case where an intermediate lever is coupled to the pedal arm via a coupling link and the case where a reaction force applying device instead of the output member is coupled to the pedal arm.

For example, the pedal bracket has a pair of side plates located on the right and left sides of the pedal arm. The pedal arm is swingably supported by a support shaft extending between the pair of side plates, and the operation amount sensor is placed on the outside of one of the side plates. For example, the operation amount sensor is configured to detect a swing stroke or a swing angle of the pedal arm. However, the operation amount sensor may be configured to detect a depression operation force of the pedal device, a transmission load, etc.

It is desirable that the cover member be made of a lightweight synthetic resin material. However, the cover member may be made of other materials such as a metal material like aluminum that is lightweight and easily moldable. For example, the cover member may be attached in a single-step operation by using an insertion clip made of a synthetic resin, etc., or may be attached to the pedal bracket by screwing a bolt etc. For example, the reinforcing member is made of a sheet metal such as iron, and the sheet metal simply bent into an L-shape etc. is preferably used as the reinforcing member. For example, an L-shaped side edge of the reinforcing member is fixedly attached to a side surface of the pedal arm etc. by welding etc. so that one of a pair of flat plate portions of the sheet metal bent into the L-shape is inserted between the lower wall portion of the cover member and the operation amount sensor. The reinforcing member may be attached to the side surface of the pedal arm by welding etc. such that the other flat plate portion extends parallel to, and in closely contact with, the side surface of the pedal arm.

Embodiment

An embodiment of the present invention will be described in detail with reference to the accompanying drawings.

Figure 1:
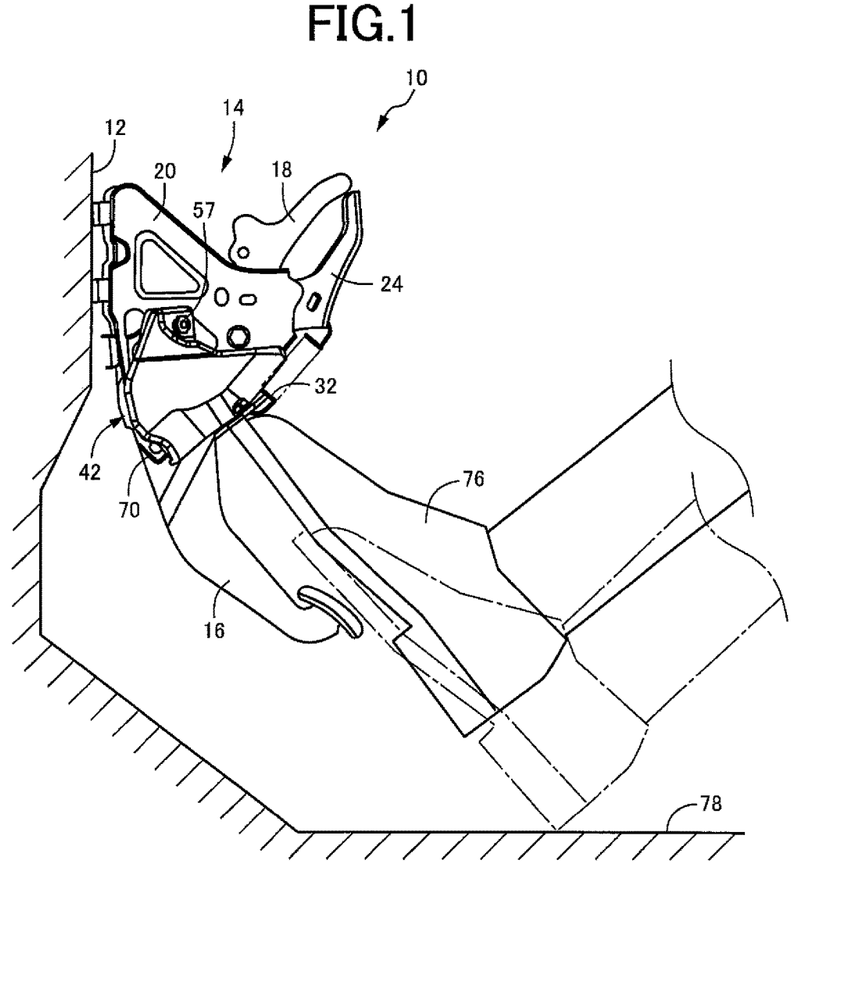
FIG. 1 is a left side view of a vehicle operation pedal device for service brakes of vehicles according to an embodiment of the present invention, showing the vehicle operation pedal device mounted on a vehicle.
Figure 2:
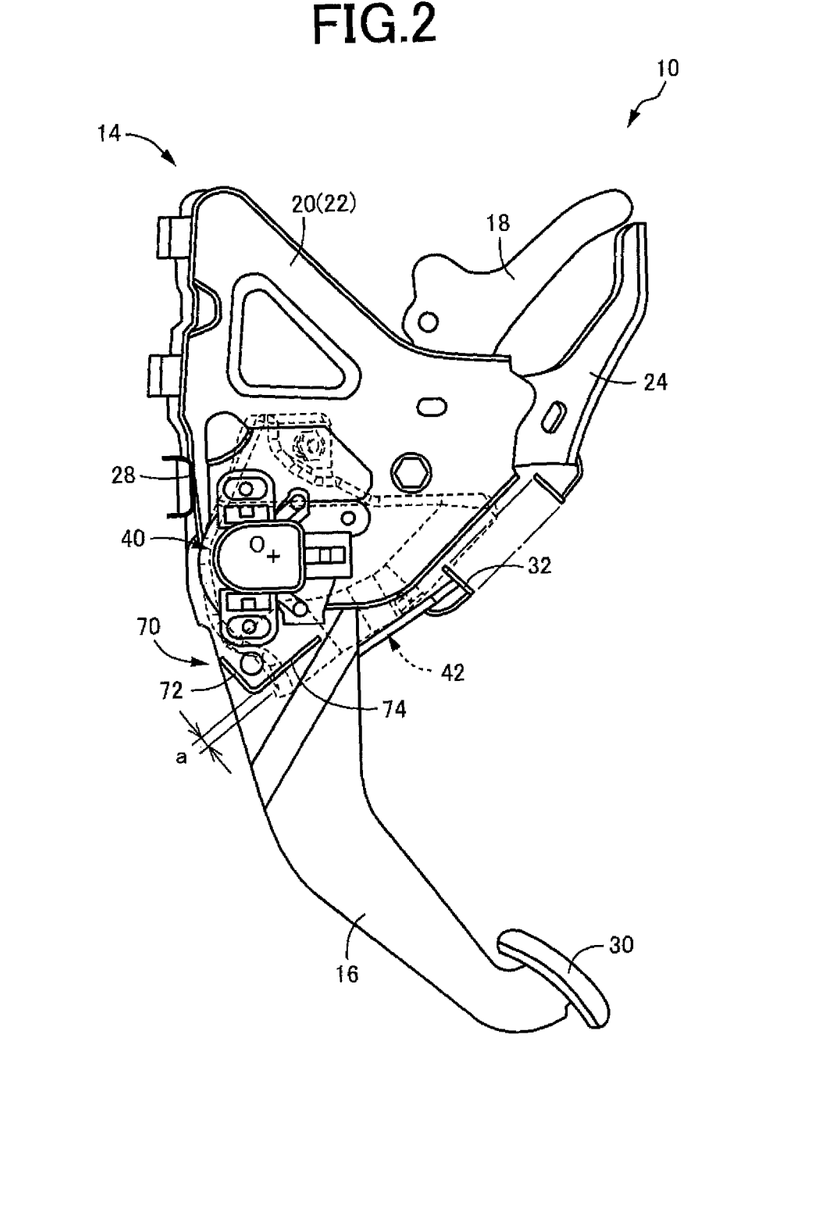
FIG. 2 is an enlarged left side view showing only the vehicle operation pedal device shown in FIG. 1.
Figure 3:
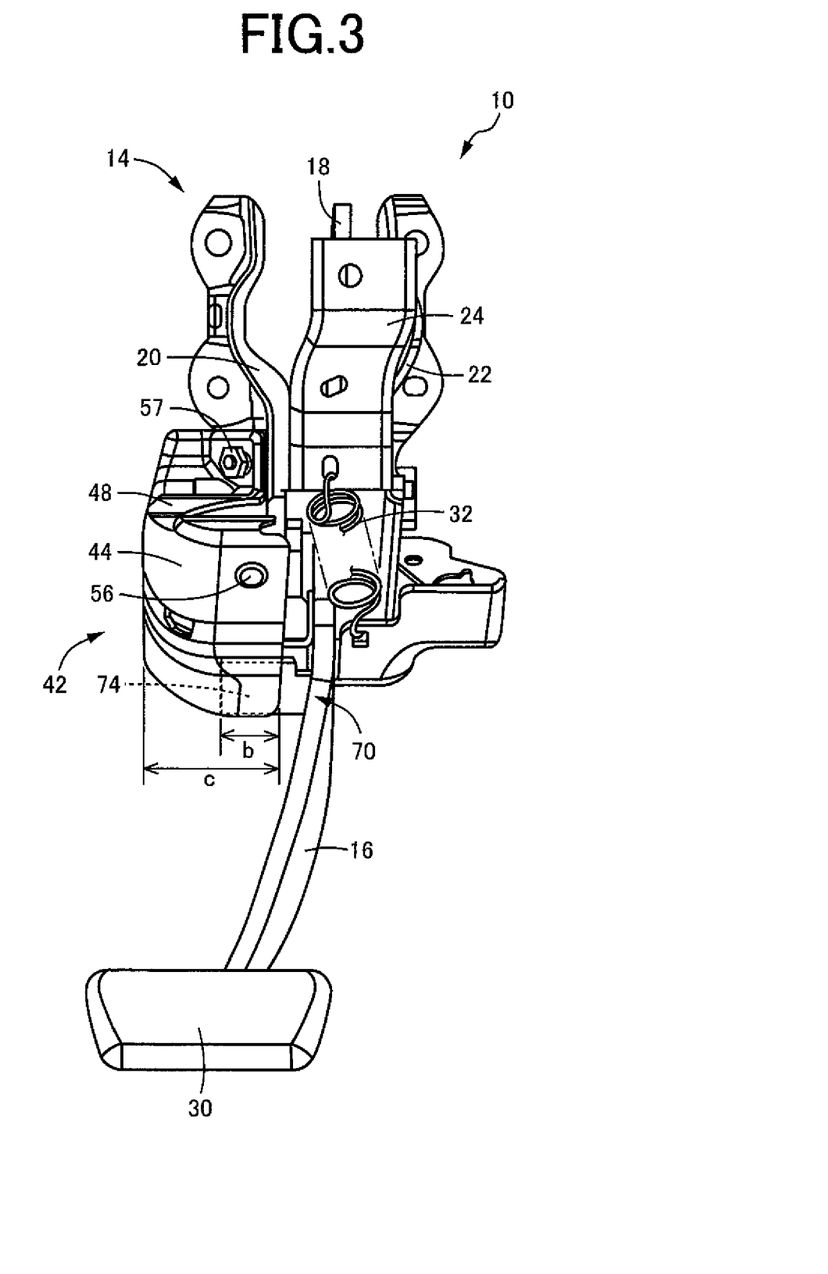
FIG. 3 is a front view of the vehicle operation pedal device shown in FIG. 2 as viewed from the driver's seat side.
Figure 4:
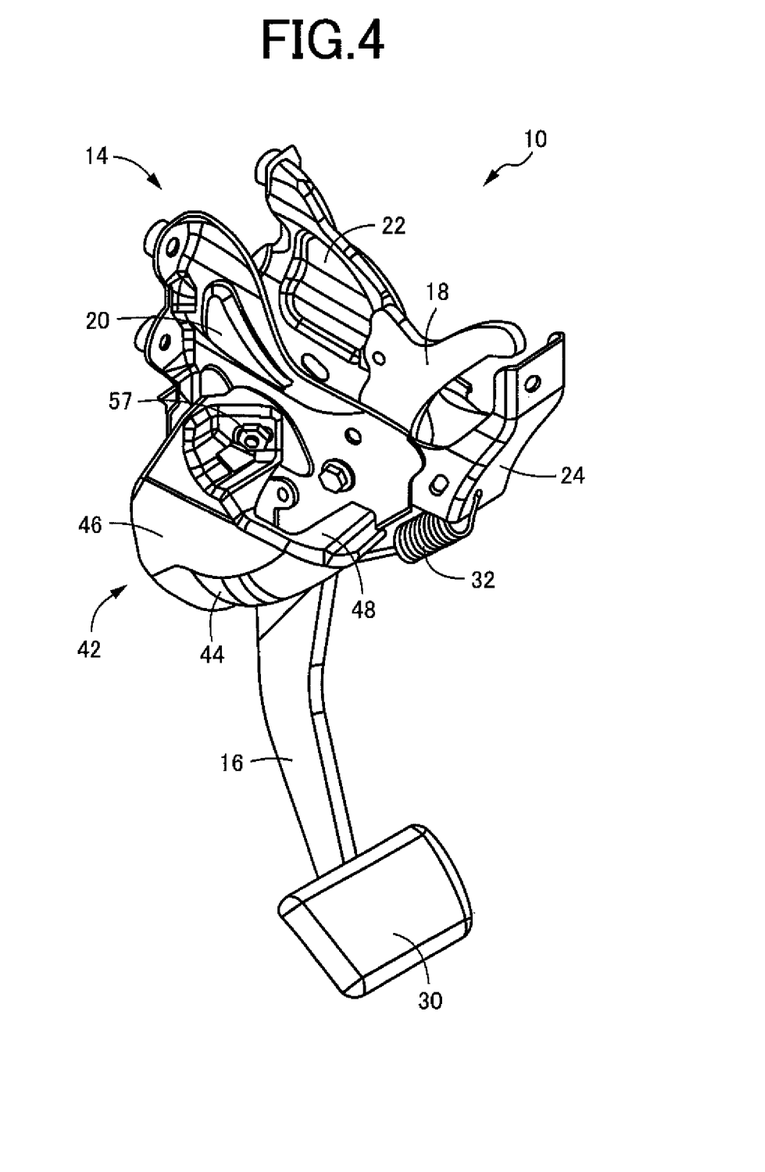
FIG. 4 is a perspective view of the vehicle operation pedal device shown in FIG. 2 as viewed obliquely downward from the upper left of the driver's seat side.
Figure 5:
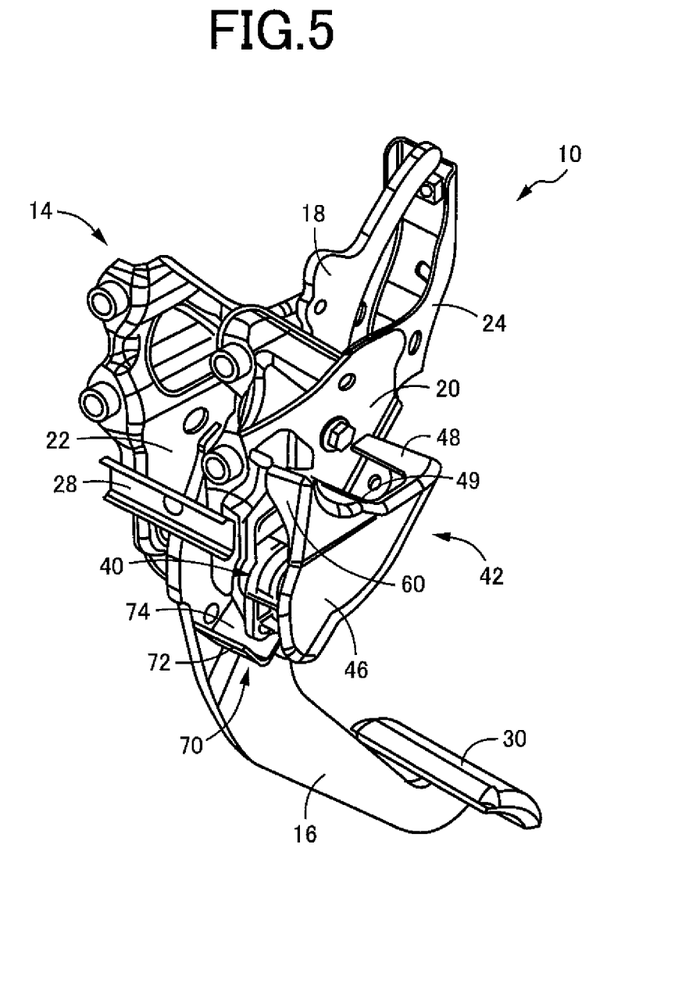
FIG. 5 is a perspective view of the vehicle operation pedal device shown in FIG. 2 as viewed obliquely downward from the upper right of the front side of the vehicle which is the opposite side from the driver's seat.
Figure 6:
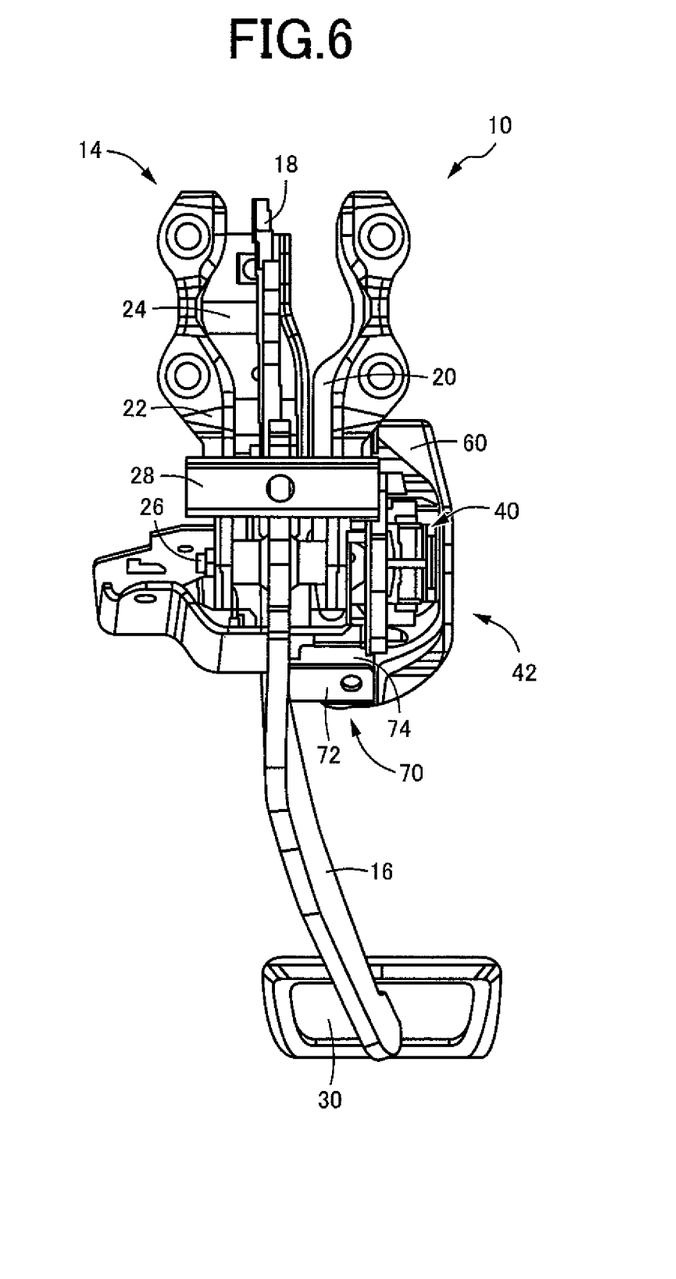
FIG. 6 is a back view of the vehicle operation pedal device shown in FIG. 2 as viewed from the front side of the vehicle which is the opposite side from the driver's seat.

FIG. 1 is a left side view of an operation pedal device 10 for service brakes of vehicles according to an embodiment of the present invention, showing the operation pedal device 10 mounted on a dash panel 12 of a vehicle. FIG. 2 is an enlarged left side view showing only the vehicle operation pedal device 10. FIG. 3 is a front view of the vehicle operation pedal device 10 as viewed from the driver's seat side. FIG. 4 is a perspective view of the vehicle operation pedal device 10 as viewed obliquely downward from the upper left of the driver's seat side. FIG. 5 is a perspective view of the vehicle operation pedal device 10 as viewed obliquely downward from the upper right of the front side of the vehicle which is the opposite side from the driver's seat. FIG. 6 is a back view of the vehicle operation pedal device 10 as viewed from the front side of the vehicle. The vehicle operation pedal device 10 includes a pedal bracket 14 that is fixedly attached to the dash panel 12, a pedal arm 16 that is operated by being depressed with a driver's foot, and an intermediate lever 18 operatively coupled to the pedal arm 16 via a coupling link. An operating rod of a brake booster etc. is coupled to the intermediate lever 18.

The pedal bracket 14 has a pair of right and left side plate members 22, 20 and a distal end coupling member 24 fixedly attached to the side plate members 20, 22 so as to couple the distal ends (on the driver's seat side) of the side plate members 20, 22. The pedal arm 16 is swingably supported about an axis (support axis) O of a support shaft 26 placed substantially horizontally between the side plate members 20, 22. The pair of side plate members 20, 22 are also fixedly coupled via a rear coupling plate 28 on the opposite side from the driver's seat, namely the dash panel 12 side. As shown in FIG. 6, the support shaft 26 is a bolt disposed so as to extend through the pair of side plate members 20, 22 and the pedal arm 16 placed therebetween. The pedal arm 16 extends downward from the pedal bracket 14, and a pedal 30 disposed at the lower end of the pedal arm 16 is operated by being depressed with the driver's foot. The pedal arm 16 is returned to its initial position shown in FIGS. 1 to 6 by a return spring 32 placed so as to extend between the pedal arm 16 and the distal end coupling member 24. The side plate members 20, 22 function as a pair of side plates that swingably support the pedal arm 16 therebetween.

Figure 7A:
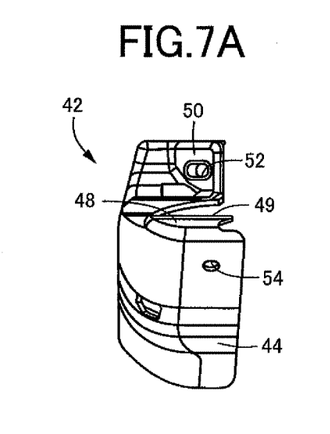
FIGS. 7A and 7D are a four-view drawing showing only the cover member attached to the pedal bracket of the vehicle operation pedal device shown in FIG. 2 as viewed in four directions.
Figure 7B:
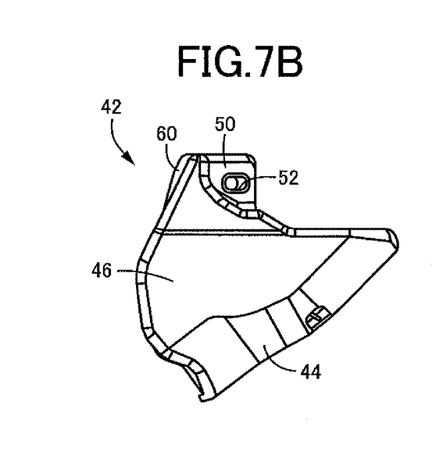
Figure 7C:
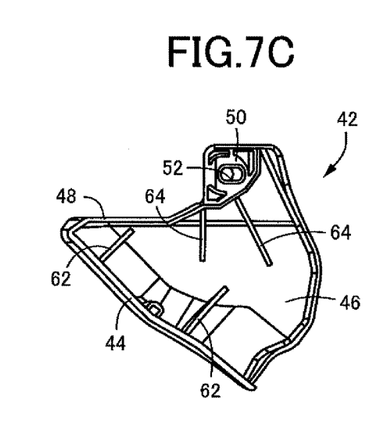
Figure 7D:
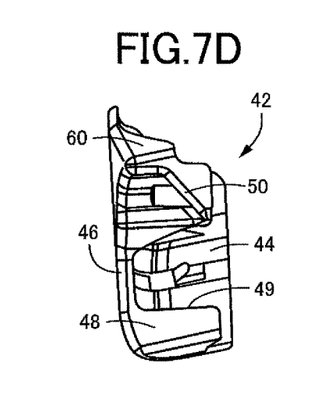

A stroke sensor 40 serving as an operation amount sensor is placed on the outside of one side plate member 20 of the pedal bracket 14, namely on the left side surface of the left side plate member 20, to detect a swing stroke of the pedal arm 16. A cover member 42 is fixedly attached to cover the stroke sensor 40. In FIG. 2, the cover member 42 is shown by dashed lines, and the stroke sensor 40 etc. located inside the cover member 42 are shown by solid lines. FIGS. 7A and 7B are a four-view drawing showing only the cover member 42 as viewed in four directions. FIG. 7A is a front view, FIG. 7B is a left side view, FIG. 7C is a right side view, and FIG. 7D is a plan view. The front view of FIG. 7A corresponds to the front view of FIG. 3. The cover member 42 is a single-piece member made of a synthetic resin material and including a lower wall portion 44 that is tilted upward toward the driver's seat so as to extend from below the stroke sensor 40 toward the driver's seat, a side wall portion 46 that is continuous with the lower wall portion 44 and disposed outside the stroke sensor 40 so as to extend upward, and an upper wall portion 48 that is continuous with the front end of the lower wall portion 44 and the side wall portion 46 and disposed above the stroke sensor 40. The cover member 42 thus covers the lower, lateral, and upper sides of the stroke sensor 40. The upper wall portion 48 has a cutout 49 through which a wire harness that is coupled to the stroke sensor 40 extends.

An attachment wall portion 50 standing substantially vertically is provided at the rear end of the upper wall portion 48. Attachment holes 52, 54 are provided with the attachment wall portion 50 and a front end of the lower wall portion 44, respectively. The lower wall portion 44 can be attached to the side plate member 20 in a single-step operation, namely by merely inserting an insertion clip 56 (see FIG. 3) made of a synthetic resin through the attachment hole 54. The attachment wall portion 50 can be attached to the side plate member 20 by inserting a screw member 57 (see FIGS. 3, 4, etc.) such as a bolt, a nut, etc. through the attachment hole 52 in order to ensure predetermined attachment strength. The side plate member 20 has insertion holes corresponding to the attachment holes 52, 54, so that the insertion clip 56 and the bolt etc. of the screw member 57 can be inserted therethrough.

A triangular rear wall portion 60 is provided on the rear side of the stroke sensor 40, which is the opposite side of the cover member 42 from the driver's seat, so as to couple the upper end of the side wall portion 46 to the attachment wall portion 50. A plurality of reinforcing ribs 62 are provided on the inner surface of a corner portion connecting the lower wall portion 44 and the side wall portion 46, and a plurality of reinforcing ribs 64 are provided on the inside of a corner portion connecting the side wall portion 46 and the upper wall portion 48 or the attachment wall portion 50.

Figure 8:
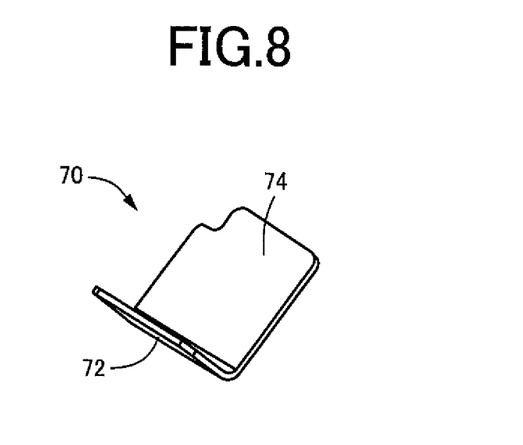
FIG. 8 is a perspective view showing only a reinforcing member fixed to a pedal arm of the vehicle operation pedal device in FIG. 2.

A reinforcing member 70 made of a metal is fixedly attached to the left side surface of the pedal arm 16 by welding etc., such that the reinforcing member 70 is interposed between the rear end of the lower wall portion 44 and the stroke sensor 40 when in an initial state where the pedal arm 16 is not operated by being depressed with the foot. As shown in FIG. 8, the reinforcing member 70 is made of a sheet metal such as iron bent into a substantially L-shape and includes a pair of flat plate portions 72, 74. The reinforcing member 70 is fixedly attached to the left side surface of the pedal arm 16 such that an L-shaped side edge of the reinforcing member 70 closely contacts the left side surface of the pedal arm 16. FIG. 8 is a perspective view corresponding to FIG. 5. When the pedal arm 16 is returned to its initial position according to the biasing force of the return spring 32, the flat plate portion 74 is inserted between the lower wall portion 44 and the stroke sensor 40 in such an attitude that the flat plate portion 74 extends substantially parallel to the lower wall portion 44, so that the flat plate portion 74 is interposed between the lower wall portion 44 and the stroke sensor 40. Accordingly, when the cover member 42 is kicked with a driver's foot 76 as shown by solid lines in FIG. 1, the lower wall portion 44 contacts the flat plate portion 74. This inhibits excessive deformation of the cover member 42 and prevents deformation and breakage of the cover member 42, whereby the stroke sensor 40 can be appropriately protected. The foot 76 is located in a normal position shown by chain lines in FIG. 1 when the driver is operating an accelerator pedal etc. The foot 76 is placed on a floor 78 when it is in the normal position. However, the driver may kick the stroke sensor 40 when, for example, he/she lifts his/her foot 76 to operate the brake pedal.

Clearance a (see FIG. 2) between the flat plate portion 74 and the lower wall portion 44 is decided as appropriate so that interference therebetween can be avoided when the pedal arm 16 swings, and excessive deformation of the cover member 42 can be inhibited and plastic deformation and breakage of the cover member 42 can be prevented. In the present embodiment, the clearance a is set to about 5 mm. The overlap dimension b between the cover member 42 and the flat plate portion 74 (see FIG. 3) is also decided as appropriate so that plastic deformation and breakage of the cover member 42 can be prevented. Since the reinforcing ribs 62 are provided in the present embodiment, the cover member 42 need only be reinforced in the range excluding the reinforcing ribs 62. For example, the overlap dimension b is about ⅓ to ½ of the overall width dimension c of the lower wall portion 44.

The rear wall portion 60 is provided at the upper end of the cover member 42 and does not interfere with the reinforcing member 70. The cover member 42 opens wide on the rear side. However, since the cover member 42 is located near the dash panel 12, the stroke sensor 40 is not likely to be damaged by an external force applied from the rear side of the cover member 42.

As described above, in the vehicle operation pedal device 10 of the present embodiment, the cover member 42 is attached to the pedal bracket 14 so as to cover the stroke sensor 40 placed on the pedal bracket 14, and the reinforcing member 70 fixed to the pedal arm 16 is interposed between the lower wall portion 44 of the cover member 42 and the stroke sensor 40. The cover member 42 thus appropriately prevents damage to the stroke sensor 40 which is caused by kicking with the foot 76. Since the reinforcing member 70 prevents excessive deformation of the cover member 42, a synthetic resin material can be used to form a lightweight, inexpensive cover member 42. Moreover, the reinforcing member 70 need only to be provided in a minimum required range in view of the direction in which the cover member 42 is kicked etc. so that the reinforcing member 70 can prevent breakage and deformation of the cover member 42. Accordingly, a lightweight, inexpensive vehicle operation pedal device can be produced which ensures predetermined strength.

The cover member 42 is a single-piece member made of a synthetic resin and including the side wall portion 46, the upper wall portion 48, and the rear wall portion 60 in addition to the lower wall portion 44. The cover member 42 thus covers the lower, lateral, upper, and upper rear sides of the stroke sensor 40. The stroke sensor 40 is therefore appropriately protected not only from kicking with the foot 76 but also from contact with the foot 76 by movements other than kicking and from dust, water, etc. In particular, since the cover member 42 is made of a synthetic resin, the cover member 42 can be molded with high design flexibility. Namely, the cover member 42 can be easily molded according to various shapes of the pedal bracket 14, various locations or shapes of the stroke sensor 40, etc. so that the stroke sensor 40 can be appropriately protected.

Since the rear wall portion 60 is provided so as not to hinder movement of the reinforcing member 70 which is associated with swinging of the pedal arm 16, the stroke sensor 40 is more appropriately protected. Since the reinforcing ribs 62, 64 are provided in the corner portion connecting the lower wall portion 44 and the side wall portion 46 and the corner portion connecting the side wall portion 46 and the upper wall portion 48 or the attachment wall portion 50, rigidity of the cover member 42 is increased. Accordingly, required strength of the pedal device can be achieved, and further reduction in weight can be achieved by reduction in thickness and reduction in size of the reinforcing member 70.

Although the embodiment of the present invention is described above in detail based on the drawings, the embodiment is shown by way of example only, and the present invention can be embodied in various modified or improved forms based on the knowledge of those skilled in the art.

Reference Signs List

10: Vehicle operation pedal device 14: Pedal bracket 16: Pedal Arm 40: Stroke sensor (Operation amount sensor) 42: Cover member 44: Lower wall portion 46: Side wall portion 48: Upper wall portion 60: Rear wall portion 62: Reinforcing rib 70: Reinforcing member O: Axis (Support axis)

The invention claimed is:

1. A vehicle operation pedal device including a pedal bracket that is attached to a vehicle, a pedal arm that is swingably supported by the pedal bracket about a substantially horizontal support axis, that extends downward from the pedal bracket, and that has at its lower end a pedal that is operated by being depressed with a foot, and an operation amount sensor that is disposed on the pedal bracket to detect an amount by which the pedal arm is operated, the vehicle operation pedal device comprising:
   a cover member that includes at least a lower wall portion extending from below the operation amount sensor toward a driver's seat and a side wall portion, and that is fixedly attached to the pedal bracket;
   a reinforcing member that is made of a metal and that is fixedly attached to the pedal arm so as to be interposed between the lower wall portion and the operation amount sensor when in an initial state where the pedal arm is not operated by being depressed with the foot; and
   a reinforcing rib that is provided on an inner surface of a corner portion connecting the lower wall portion and the side wall portion, wherein
   the reinforcing member is a sheet metal part bent into an L-shape and includes a pair of flat plate portions.

2. The vehicle operation pedal device according to claim 1, wherein
   the cover member is a single-piece member made of a synthetic resin and including the side wall portion that is continuous with the lower wall portion and disposed outside the operation amount sensor so as to extend upward, and an upper wall portion that is continuous with the side wall portion and disposed above the operation amount sensor, and the cover member covers lower, lateral, and upper sides of the operation amount sensor.

3. The vehicle operation pedal device according to claim 2, wherein
   the cover member further includes a rear wall portion disposed on a rear side of the operation amount sensor, which is an opposite side from the driver's seat, so as not to hinder movement of the reinforcing member which is associated with swinging of the pedal arm.

* * * * *